UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

FINISH-REMOVER.

1,172,773.     Specification of Letters Patent.     Patented Feb. 22, 1916.

No Drawing.     Application filed May 19, 1911. Serial No. 628,271.

*To all whom it may concern:*

Be it known that I, CARLETON ELLIS, a citizen of the United States, and now residing at Montclair, county of Essex, and State of New Jersey, have made certain new and useful Inventions Relating to Finish-Removers, of which the following is a specification.

This invention relates especially to finish removers preferably containing a small proportion of effective film-forming waxy evaporation retarding material, such as hard paraffin wax suitably incorporated with the finish solvents preferably in connection with non-waxy stiffening materials such as soap, celluloid and pyroxylin or inert stiffening material, such as wood flour, etc.

Mineral wax, such as paraffin, ozocerite, and so forth is effective in forming an evaporation retarding film on the exposed surface of finish removers so as to prevent the evaporation of the organic solvents usually employed in such removers. Such waxes are complex compounds consisting of a number of waxy components of varying melting point and other properties and the higher melting point components of paraffin, for instance, are relatively much more effective evaporation retarding material for remover purposes. For severe service conditions it is therefore desirable to use the high melting point components of paraffin or other suitable waxy material and for ordinary service a much smaller proportion of such waxy stiffening material gives suitable film forming and evaporation retarding action. In this way, the soft greasy material usually present in ordinary paraffin and which is undesirable for some purposes is substantially eliminated from the composition and also much less waxy stiffening material may be used in the composition. The hardest commercial grades of paraffin, such as those which have melting points of fifty-five degrees C. or so are suitable in this connection, and if desired special high melting point waxy material may be produced by fractionation of paraffin or similar wax. This may be done in any desired way as for instance by dissolving the wax in a suitable solvent, such as benzol, and then adding a relatively small proportion of wood alcohol to partially precipitate the wax preferably when the solution is still slightly warm, say, at temperatures of about 25 to 30 degrees C.

The precipitated material may then be separated and the solvent removed therefrom by pressure or heat, or both, so as to secure the high melting point components of the wax. For example, hard paraffin wax having a melting point of 57 degrees C. may be dissolved in benzol in the proportion of 65 grams of wax in 200 CC. of benzol to which wood alcohol is added in the proportion of 25 CC. to the amounts above specified. When this is allowed to stand for three hours or so at room temperature, the wax precipitates to thicken or partly solidify the mixture. On pressing, the solvent may be largely removed and on heating to remove the remaining solvent material the harder components of the wax may be recovered to the extent of about 50 or 55 per cent. of the original paraffin and this harder higher melting point fraction of the wax has a melting point of about 63 degrees C. in the case of some grades of wax treated in this way. Such high melting point fractionated paraffin wax is less soluble in mixtures of remover solvents, such as benzol, alcohol, acetone, or the like, than the lower melting point wax from which it was derived for instance and thus has an increased precipitating and film forming action under conditions of remover service.

The use of a small fraction of a per cent. of such high melting point fractionated paraffin wax melting at about 63 degrees C. gave distinct film forming and evaporation retarding action when incorporated with volatile remover solvent. Such material when used to the extent of one-half or even one-quarter of one per cent. in equal part mixtures of benzol and acetone had valuable film forming evaporation retarding properties so that it is unnecessary for general remover work to use a large percentage of this waxy stiffening material in order to secure the desired evaporation retarding action in the composition; although for severe service conditions it is of course desirable to use somewhat more of the hard waxy stiffening material. The desired increase of consistency or mechanical thickening of the remover may in such cases be secured by the use of non-waxy stiffening materials, such for example as pyroxylin or celluloid in the form of celluloid scrap for instance, which have the desirable property of having a substantially uniform thickening action under varying temperature conditions so as to render the consistency of the remover less dependent on ordinary temperature changes. Other cellulose esters such as nitro hydrocellulose, nitro oxycellulose and other products of the nitration of degraded cellulose are also valuable in this connection. Suitable soaps may also be used and the soaps of polymerized oils are desirable. Polymerized castor oil soap, for instance, may be prepared by heating castor oil between 150 and 250 degrees C. which polymerizes the oil and produces a chemical change, so that the oil is no longer insoluble in mineral oils. Sodium or potassium soaps of this polymerized castor oil may be used as remover thickeners, or if desired the soaps of the sulfonated polymerized oil may be prepared by adding 20 parts or so of strong sulfuric acid to 100 parts of the polymerized oil and allowing the mixture to stand for 24 hours. Washing with brine removes the uncombined acid and then the oil may be neutralized with caustic soda or other alkali. Such sulfonated soaps do not form water insoluble products with lime or magnesia and thus can be used in conjunction with such inert thickeners. The lime soap of such sulfonated products may also be used as a thickener. Also, if desired, suitable inert stiffening material, such as wood flour, starch, whiting, magnesia or infusorial earth, may be used.

For many purposes it is desirable to use in removers for severe service a considerable proportion of relatively non-volatile liquid preventing the drying of the thickening material. It is desirable to use for this purpose a balanced heavy liquid component in order to have less interference with the evaporation retarding action of the wax when the remover is allowed to remain on the work a long time and this may be secured by the incorporation of relatively non-volatile wax solvent and wax precipitating material to suitably balance the wax solvent properties of this heavy component. These balanced heavy liquid ingredients thus have considerable neutralizing action or tendency upon each other in regard to their wax solvent or wax precipitating action in the remover so that when the remover is allowed to remain on the work a long time the wax solvent properties of this heavy liquid component of the remover are sufficiently counterbalanced so as to maintain unaltered the physical condition of the wax to a much greater extent than would be the case if this heavy liquid were similar in wax solvent properties to carbon-tetrachlorid for instance.

Suitable heavy or relatively non-volatile wax solvent materials in this connection are chlor benzol, liquid chlorinated naphthalene, tetra chlorethane, penta chlorethane, turpentine, wood turpentine, heavy solvent naphtha, gas naphtha, chlor gas naphtha, light Borneo petroleum, texene, that is, light Texas petroleum products similar to benzin or light kerosene, nitro toluol, etc. Suitable heavy or relatively non-volatile remover liquids of relatively less solvent power for wax so as to have a wax precipitating or balancing action with respect to the foregoing are di-propyl ketone, butyrone, methyl propyl ketone, valerone, di-butyl ketone, light and heavy acetone oils, diethyl ketone and chlor diethyl ketone, aldehydes or mixed aldehydes and alcohols, such as formed by the oxidation of amyl alcohol, light and heavy oils of wood tar, especially deodorized heavy oil of wood tar, chlor ethyl acetate, stearone or dihepta decyl ketone, aceto or formo dichlor hydrin, glycerole chlorhydrin or other derivatives of gas naphtha and other unsaturated petroleum products or olefins, such as the chlor hydrins, olefin oxids, etc., eugenol, allyl alcohol, quasi allyl alcohol, chlor allyl alcohol, benzyl alcohol, acetal, chlor acetal, sebacic ether, benzal chlorid, etc.

A suitable illustrative composition may comprise 40 parts of benzol, 30 parts of wood alcohol, 10 parts of acetone, with which is incorporated one-half to one part of hard fractionated paraffin having a melting point of 60 degrees C. or more and additional stiffening material, such as 3 to 4 parts of pyroxylin; also, if desired, 8 parts of benzyl alcohol and 7 parts of pine oil may be used in this composition to form a considerable proportion of heavy relatively non-volatile liquid preventing the drying of the material even under severe service conditions.

Another suitable illustrative composition may comprise 45 parts of benzol, 34 parts of methyl acetone, one-half part of hard fractionated paraffin or ozocerite, 9 parts of wood turpentine, 4 parts of gas naphtha or olefin oxid and 5 parts of deodorized heavy oil of wood tar.

Another suitable illustrative composition may comprise 40 parts of toluol, 31 parts of wood alcohol, one-fourth to one-half part of hard ozocerite, 3 parts of nitro hydro cellulose, 2 to 3 parts of beta naphthol, 12 parts of chlor benzol, 5 parts of ethyl acetate and 6 parts of stearone.

Another suitable illustrative composition may comprise 51 parts of benzol, 15 parts of methyl acetone, 20 parts of methyl alcohol, one-half part of hard fractionated wax, such as fractionated paraffin, or of ozocerite or beeswax, 3½ parts of cellulose scrap, 5 parts of wood turpentine and 5 parts of light oil of wood tar.

Another suitable illustrative composition may comprise 25 parts of benzol, 10 parts of petroleum benzin, 30 parts of wood alcohol, 10 parts of denatured alcohol, one-half part of hard fractionated paraffin, 3½ parts of camphor, 2 parts of nitro oxycellulose, 3 parts of methyl cresylate, 9 parts of phenyl acetate, 3 parts of nitro toluol and 4 parts of tetra chlorethane.

Another illustrative composition may comprise 50 parts of benzol, 50 parts of methyl acetone, 6 parts of scrap celluloid and one part of paraffin wax.

Another suitable illustrative composition may comprise 45 parts of benzol, 45 parts of methyl acetone, 3 parts of pine oil, 4 parts of benzyl alcohol and 2 parts of scrap celluloid and one-half to one part of hard paraffin which may be of the fractionated high melting point grade referred to.

As above indicated the remover composition may be largely made up of volatile organic finish solvent material comprising suitable penetrating and loosening finish solvent material. Many penetrating finish solvents, that is solvents having a generally benzolic character or action in removers may be used in such compositions, including benzol and its homologue toluol, etc., and the commercial forms therefor and also the somewhat analogous petroleum hydrocarbons such as the lighter petroleum products, gasolene and naphtha, as well as carbon bisulfid, etc. Many loosening finish solvents, that is solvents of a generally alcoholic character or action in removers may be used in this connection, such as methyl and ethyl alcohols, preferably in their commercial forms, including denatured alcohol or the esters thereof; also many ketonic bodies having a generally similar character or action may be used, such as methyl ethyl ketone, acetone, etc.

This invention has been described in connection with a number of illustrative ingredients, formulas, proportions, and processes, to the details of which disclosure the invention is not, of course, to be limited.

What is claimed is:

1. The finish remover comprising approximately 40 parts of benzol, 30 parts of wood alcohol, 10 parts of acetone, one-half to 1 part of hard fractionated paraffin having a melting point of 60 degrees C. or more, 3 or 4 parts of pyroxylin, 8 parts of benzyl alcohol and 7 parts of pine oil.

2. The finish remover comprising approximately 40 parts of benzol, 30 parts of alcohol, 10 parts of acetone, a fraction of a per cent. of hard fractionated mineral wax having a melting point of 60 degrees C. or more, several per cent. of soluble cellulose ester, 8 parts of benzyl alcohol and 7 parts of pine oil.

3. The finish remover comprising 40 parts of penetrating finish solvent material, 40 parts of loosening finish solvent material comprising wood alcohol, a fraction of a per cent. of hard fractionated mineral wax, several per cent. of soluble cellulose ester and 15 per cent. of relatively non-volatile remover solvent comprising substantially balanced wax solvent and wax precipitating components.

4. The finish remover consisting in greater part of substantially equal proportions of penetrating and loosening finish solvent material and containing a small percentage of hard mineral wax, several per cent. of non-waxy stiffening material and a number of per cent. of finish solvent material comprising substantially balanced wax solvent and wax precipitating components.

5. The finish remover consisting in greater part of volatile penetrating and loosening finish solvent material, a small proportion of film forming hard mineral wax and several per cent. of non-waxy colloidal stiffening material and a number of per cent. of relatively non-volatile miscible liquid comprising wax precipitating material.

6. The finish remover consisting in large part of volatile finish solvent material, a fraction of a per cent. of incorporated film forming hard mineral wax, additional stiffening material and several per cent. at least of relatively non-volatile miscible liquid comprising wax precipitating material to prevent the drying out of the remover residue and to maintain the film forming action of the waxy material.

7. The finish remover consisting in greater part of composite volatile organic finish solvent material, a small proportion of incorporated film forming waxy material consisting of hard wax having a melting point of 60° C. or more and a number of per cent. of relatively non-volatile miscible liquid comprising wax precipitating material to prevent undesirable drying out of the remover residue and to maintain the film forming action of the waxy material.

CARLETON ELLIS.

Witnesses:
JESSIE B. KAY,
ALBERT C. THAYER.